C. D. LOEHR.
NUT LOCK.
APPLICATION FILED MAR. 30, 1909.
949,741.
Patented Feb. 15, 1910.
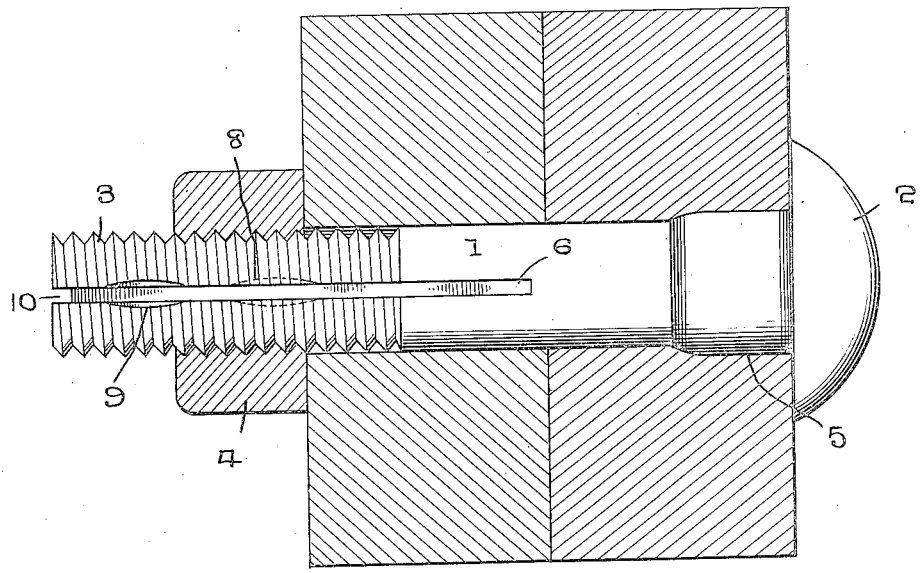
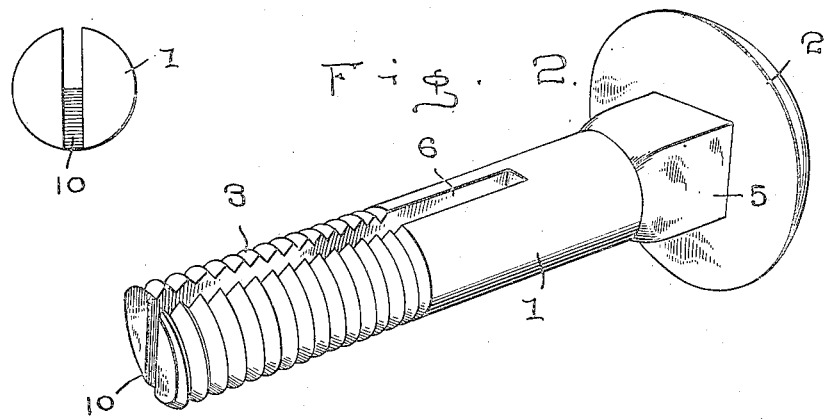
WITNESSES:
INVENTOR
C D Loehr
BY
Attorneys

UNITED STATES PATENT OFFICE.

CLARENCE D. LOEHR, OF LAPORTE, INDIANA.

NUT-LOCK.

949,741.  Specification of Letters Patent.  Patented Feb. 15, 1910.

Application filed March 30, 1909. Serial No. 486,669.

*To all whom it may concern:*

Be it known that I, CLARENCE D. LOEHR, a citizen of the United States, residing at Laporte, in the county of Laporte and State of Indiana, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and my object is to provide means for swelling parts of the bolt to prevent the nut from leaving the same after being turned thereon.

Other objects and advantages will be hereinafter referred to and more particularly pointed out in the claim.

In the accompanying drawings forming part of this application, Figure 1 is an elevation of the bolt showing the nut and parts through which the same is extended, in section. Fig. 2 is a perspective view of the bolt, and, Fig. 3 is an end elevation thereof with the head of the bolt omitted.

Referring to the drawings in which similar reference numerals designate corresponding parts throughout the several views, 1 indicates a bolt, one end of which is provided with a head 2, while the opposite portion thereof is provided with threads 3, which threads are adapted to receive a nut 4. That portion of the bolt 1 adjacent the head 2 is preferably provided with a square portion 5, which prevents the bolt from turning after it has been introduced through an object having a square opening therein, or the bolt may be left round if preferred, and in order to securely lock the nut on the bolt, the threaded portion of the bolt is provided with a longitudinally extending slot 6, in which slot a tool of larger dimensions than the width of the slot may be introduced, to spread or enlarge the surface of the bolt and by first ascertaining the position the nut will assume when turned onto the bolt and introducing the instrument in the slot and thus enlarge the surface of the bolt as best shown by dotted lines at 8 in Fig. 1, the nut when forced onto the bolt, will be tightly clamped thereon. After the nut has been thus turned home, the instrument may be introduced immediately in the rear of the nut and the surface of the bolt expanded as shown at 9, thereby securely locking the nut against casual rotation. It will be understood of course that the enlargement or expansion of the parts of the bolt will not be such as to prevent the nut from being forced on or off of the bolt, the nut when turned onto the bolt, causing the walls of the slot at the points of enlargement to be compressed to a natural position or conform to the inner circumference of the nut and by providing the end of the bolt with an auxiliary slot 10, the end of the bolt may be spread to lock the nut when the nut is located so near the end of the bolt as to prevent the tool from being introduced into the slot 6. By providing this form of bolt, it will be readily seen that the nut can be securely locked on the bolt and removed as many times as occasion may require, and it will likewise be seen that the usual or any preferred form of nut or bolt may be used, the only requirements being to provide the bolt with the slots as shown, to render the same applicable for use in locking the nut on the bolt.

What I claim is:

In a nut lock, a bolt threaded at one end and having a longitudinal slot extending along one side thereof, a transverse auxiliary slot bifurcating the unheaded end of said bolt and intersecting said longitudinal slot, a nut adapted to be applied to said bolt, said slot being bulged at a point over which said nut rests and also at a point just beyond where said nut rests, said bulges in the slot causing corresponding bulges upon the surface of the threaded portion of said bolt, whereby said nut is secured against casual rotation.

In testimony whereof I have signed my name to this specification in the presence of two subscribing witnesses.

CLARENCE D. LOEHR.

Witnesses:
 CHARLES O. LARSON,
 HOMER F. RAINSBERGER.